United States Patent
Molins Borrell et al.

(10) Patent No.: US 9,238,896 B2
(45) Date of Patent: Jan. 19, 2016

(54) FLOATING STRUCTURE FOR SUPPORTING A WIND TURBINE

(71) Applicant: UNIVERSITAT POLITÉCNICA DE CATALUNYA, Barcelona (ES)

(72) Inventors: Climent Molins Borrell, Barcelona (ES); Josep Rebollo Pericot, Barcelona (ES); Alexi Campos Hortigüela, Barcelona (ES)

(73) Assignee: Universitat Politècnica de Catalunya (ES)

( * ) Notice: Subject to any disclaimer, the term of this patent is extended or adjusted under 35 U.S.C. 154(b) by 0 days.

(21) Appl. No.: 14/795,288

(22) Filed: Jul. 9, 2015

(65) Prior Publication Data
US 2015/0308068 A1 Oct. 29, 2015

Related U.S. Application Data

(63) Continuation-in-part of application No. 14/310,384, filed on Jun. 20, 2014, which is a continuation-in-part of application No. PCT/ES2012/070884, filed on Dec. 19, 2012.

(51) Int. Cl.
*E02D 27/50* (2006.01)
*E02D 27/42* (2006.01)
*E02B 17/02* (2006.01)
(Continued)

(52) U.S. Cl.
CPC .............. *E02D 27/425* (2013.01); *E02B 17/02* (2013.01); *E02D 27/50* (2013.01); *E02D 27/52* (2013.01); *F03D 11/045* (2013.01)

(58) Field of Classification Search
CPC ........ E02D 11/045; E02D 27/50; E02D 27/52; E02D 27/425; E02B 17/02
See application file for complete search history.

(56) References Cited

U.S. PATENT DOCUMENTS

| 3,225,500 | A |   | 12/1965 | Martter |  |
|---|---|---|---|---|---|
| 3,537,268 | A | * | 11/1970 | Georgii | B65D 88/78 114/264 |
| 4,166,347 | A | * | 9/1979 | Pohlman | E04C 3/34 52/223.4 |

(Continued)

FOREIGN PATENT DOCUMENTS

| JP | 2002188557 A | 7/2002 |
|---|---|---|
| JP | 2009018671 A | 10/2009 |

(Continued)

*Primary Examiner* — Patrick Maestri
(74) *Attorney, Agent, or Firm* — Hess Patent Law Firm LLC; Robert J. Hess

(57) ABSTRACT

The floating structure for supporting a wind turbine comprises a SPAR-type hollow precast monolithic body made of concrete prestressed by active reinforcement members having a cylindrical lower section (13) closed at its lower end by a hemispheric cap (18) which contains ballast (14) and acts as a flotation element and an upper section (12) located above sea level, which acts as a support for the wind turbine or other element. One or more of the active reinforcement members have opposite ends anchored to a steel ring-shaped plate (17) attached to an upper end of the upper section (12) and an intermediate section which has continuity within the hemispheric cap (18). The structure is preferably moored to the seabed by means of cable lines (15), through heavy weight elements (16) or suction piles capable of counteracting vertical and horizontal force components induced by the mooring lines.

11 Claims, 2 Drawing Sheets

(51) Int. Cl.
  E02D 27/52 (2006.01)
  F03D 11/04 (2006.01)

(56) References Cited

U.S. PATENT DOCUMENTS

| | | | | |
|---|---|---|---|---|
| 6,244,785 | B1* | 6/2001 | Richter | B63B 3/04 114/125 |
| 6,575,665 | B2* | 6/2003 | Richter | B63B 3/04 114/125 |
| 6,672,803 | B2* | 1/2004 | Richter | B63B 3/04 405/195.1 |
| 2001/0036387 | A1* | 11/2001 | Richter | B63B 3/04 405/195.1 |
| 2003/0165361 | A1* | 9/2003 | Richter | B63B 3/04 405/195.1 |
| 2006/0165493 | A1* | 7/2006 | Nim | B63B 35/44 405/223.1 |
| 2013/0224020 | A1* | 8/2013 | Dagher | B63B 5/14 416/84 |

FOREIGN PATENT DOCUMENTS

| | | |
|---|---|---|
| WO | WO 9821415 A1 | 5/1998 |
| WO | WO 2006132539 A | 12/2006 |
| WO | WO 2010106208 A | 9/2010 |
| WO | WO2010110329 | 9/2010 |
| WO | WO 2010110330 | 9/2010 |
| WO | WO 2012061710 A2 | 5/2012 |
| WO | WO 2013093160 A2 | 6/2013 |

\* cited by examiner

FLOATING STRUCTURE FOR SUPPORTING A WIND TURBINE

FIELD OF THE INVENTION

The present invention relates to a floating structure comprising a precast monolithic concrete body for supporting high power wind turbines. The floating structure of the present invention is encompassed in the scope of renewable energies, specifically in harnessing wind energy in maritime areas having a great depth of more than 150 meters.

In the context of this specification, the term "precast monolithic concrete body" is used to designate a body made of a single cast piece of concrete with no joints obtained by continuous pouring.

In the context of this specification, the terms "upper" and "lower" refer to positions of parts of the precast monolithic concrete body when the floating structure is in its vertical operative position.

PRIOR ART

In the context of global trend that tends towards the use of renewable energies including, among others, the technology referring to extraction of electrical energy from the wind, it has experienced significant technological and R&D advancement over a short time period.

The most significant advancements have been referred and still refer to wind turbines with much higher powers, lighter and with longer service life than their predecessors. This has allowed planning and using structure designs for supporting wind turbines located in the sea, where the costs relating to the foundation necessary for these structures are considerably more significant than in structures with foundations on land (onshore) and which together with high power wind turbines which, on the other hand, do not require supporting structures that are significantly more expensive than the costs for their predecessors, allow from a business point of view for absorbing the extra costs derived from the positioning in the sea which are compensated with greater installed potential.

Even though the marine wind power generation technology has been proven to have various advantages up until now, they are affected due to the difficulty in finding marine locations with favorable wind conditions as well as with bathymetries that allow fixing these structures in maximum depths of the order of 50 meters at a certain distance away from the shore, where it is possible to install large marine wind farms that do not generate significant impact, mainly visual impact from the point of view of social acceptance of the infrastructure.

The foregoing makes designing floating platforms for supporting wind turbines comprehensible since they allow installing large wind farms away from the shore and regardless of the depth of the area considered.

Until now, some documents concerning to different designs of floating platforms for said purpose have been developed, among which WO2010106208 and WO2006132539 stand out since they allow by their simplicity assuring system stability without having the need for active stability control elements apart from those typical of wind turbines.

Document US20060165493 describes a design formed by 3 different flotation points with an active ballast fluid transfer system between them which involves significant maintenance costs, in addition to an increased cost due to the existence of the several flotation points.

Other designs such as those presented in WO2010110329 and WO2010110330 maintain a philosophy similar to that proposed in WO2006132539, introducing installation methods that allow facilitating the placement thereof in the end site.

In all the preceding cases, the basic construction material is steel, some of them (WO2010110329 and WO2010110330) limiting the use of concrete to the production of the ballast weight.

Document WO 2012061710 A2 discloses a wind turbine platform including a hull defining a hull cavity therein configured for floating in a body of water. The hull is formed from reinforced concrete. A tower configured to mount a wind turbine is connected to the hull. Anchor members are connected to the hull and to the seabed.

Document U.S. Pat. No. 3,537,268 A discloses a marine station formed of one or more concrete cylinders cast in situ in a body of water over the location intended for the station. A lower end of the cylinder or of a lower one of said cylinders is closed by a hemispheric cap. The cylinder or cylinders are then sunk into position. The cylinders are provided with internal chambers adapted to accommodate personnel and/or equipment. The cylinders may be supported on piles or by cables or on platforms or the like.

DISCLOSURE OF THE INVENTION

The SPAR type floating structure object of the present invention comprises a floating precast monolithic concrete body having hollow cylindrical and frustoconical geometries. The precast monolithic concrete body is made of reinforced and prestressed concrete comprising a hollow cylindrical lower section finished at a lower end thereof by a hemispheric cap, which contains ballast and acts as a flotation element, and a hollow upper section, located above sea level, which acts as a support for a wind turbine or another element. The upper section has preferably a frustoconical shape having a wider outer diameter at its lower end coinciding with the outer diameter of the hollow cylindrical lower section and a smaller outer diameter at its upper end.

The reinforced and prestressed concrete of the precast monolithic concrete body comprises active reinforcement members, some of which have continuity within said hemispheric cap. Said upper section is finished at an upper end thereof with a steel ring-shaped plate to which one or more of said active reinforcement members are anchored. The active reinforcement members are steel tendons inserted in protective sheaths embedded in the concrete and post tensioned.

One or more of the active reinforcement members having continuity within the hemispheric cap is anchored at both ends thereof to the steel ring-shaped plate.

Optionally, another one or more of the active reinforcement members having continuity within the hemispheric cap has a first end anchored to the steel ring-shaped plate and a second end anchored at one point of the precast monolithic concrete body, and/or another one or more of the active reinforcement members having continuity within the hemispheric cap has both ends thereof anchored at different points of the precast monolithic concrete body, and/or other active reinforcement members having no continuity within the hemispheric cap have a first end anchored to the steel ring-shaped plate and a second end anchored at one point of the precast monolithic concrete body or both ends anchored at different points of the precast monolithic concrete body.

The precast monolithic concrete body, including said cylindrical and frustoconical sections, has a total length comprised between 110 and 320 meters, outer diameters comprised between 2.8 and 15.2 meters and wall thicknesses comprised between 20 and 100 centimeters.

The wind turbine or another element is preferably attached to the steel ring-shaped plate which is attached in turn to the precast monolithic concrete body by upper anchoring elements of the active reinforcement members, so that the steel ring-shaped plate performs a double function as an attachment for the wind turbine or another element and as a stress distribution plate for upper anchoring elements of the active reinforcement members. For example, a rotating nacelle of the wind turbine is removably attached to the steel ring-shaped plate by fastening elements, such as bolts or the like.

In one embodiment, the floating structure is moored to the seabed by mooring lines having an upper end attached to the precast monolithic concrete body and a lower end connected to a mooring element. The mooring lines have attached thereto, and at different points distributed therealong, additional floating elements made of a material having a lower density than marine water. Said floating elements are selected so that, when are submerged in use, compensate for 50% or more of the weight of said mooring lines. The effect to be achieved is to limit the vertical force component induced to the precast monolithic concrete body by the tension to which the mooring line is subjected. Additionally, by minimizing the deformation of the mooring line due to its own weight, higher horizontal rigidity is achieved at the fixing points of the precast monolithic concrete body, minimizing their movements.

The mooring lines are preferably comprised of new synthetic fiber ropes, such as for example polyester ropes made of polyethylene terephthalate (PET) which, unlike the known system, have little-known long-term rheological characteristics and properties with respect to fatigue stresses of the material, so the proposal is innovative from the point of view of attaining certain interesting properties of new materials, avoiding the uncertainty posed by same.

By minimizing their deformation due to their own weight, the mooring lines acquire an almost rectilinear shape which, unlike the catenary type deformed mooring lines present in typical known systems, causes a significant reaction vertical force component at the fixing point on the seabed. This results in the need for laying foundations which allows withstanding said vertical force components. The proposed foundations must be of the heavy weight block type with own weight or suction piles, depending on the geotechnical characteristics of the earth forming the seabed.

The floating structure allows assuring stability, adopting maximum keel angles of the order of 4° to 10°, which can be borne perfectly by the existing wind turbines.

The main novelty introduced with respect to other existing documents such as WO2006132539 is the consideration of reinforced and prestressed concrete as a basic construction material for the precast monolithic concrete body.

By comparing concretes with steels in highly aggressive chloride environments, such as the case of a marine environment, concretes have a very good durability with significant reduction in inspection and maintenance task, the use of special protective paints and sacrifice anodes not being necessary. Likewise, although normal concretes have a low permeability, the use of certain additional elements, such as for example silica fume, filler and admixtures, allows increasing both the compactness (impermeability) and the final resistance of the concrete.

System stability is based on the generation of a stabilizing torque due to the distance between the center of buoyancy (CdC) and the center of gravity (CdG) of the system. Unlike other solutions such as that proposed in WO2010106208, where the geometry plays a very important role in maximizing the distance between the CdG and the CdC, there has been provided in this case a simple geometry which allows, without complex geometries or singular elements, assuring the necessary separation between CdG and CdC as a result of using as the ballast materials certain types of aggregates, such as for example black slag from electric arc furnace, with a density/cost ratio that allows drastically lowering the CdG of the system without involving an unfeasible cost for performing same.

The precast monolithic concrete body of the floating structure is formed by a hollow, cylindrical lower section which acts as a flotation element and another cylindrical and/or frustoconical upper section, located above sea level, which acts as a support for the wind turbine or other element. In both the cylindrical lower and frustoconical upper sections different openings are arranged connecting the hollow inside of the precast monolithic concrete body with the outside for construction and/or maintenance purposes. Removable sealing elements are provided which enable opening/sealing these openings.

Due to the fact that concrete is barely resistant to tensile stresses and that it is a structure where the external actions generate high bending stresses, the precast monolithic concrete body must be prestressed to prevent concrete decompression, preventing failures as a result of traction as well as possible cracks that may affect the leak-tightness of the system.

The hydrostatic pressure acting on the hemispheric shape at the base of the lower section assures that the concrete is well confined, minimizing the bending stresses and allowing an optimal travel for the protective sheaths in which the active reinforcing members are inserted.

Additionally, the actual outer diameter of the lower section constituting the flotation cylinder allows having a stabilizing torque for stabilizing the twisting movement of the precast monolithic concrete body through the torques introduced by the attachment of the mooring lines thereto.

The proposed system will allow greater ease for construction in series with respect to the conventional steel structures, due to the versatility of the large scale production of concrete elements, reducing the cost per MW installed in a very significant manner.

Similarly to the inventions cited previously, the structure can be towed throughout the service life thereof for maintenance or relocation purposes.

BRIEF DESCRIPTION OF THE DRAWINGS

The above and other features and advantages will be better understood from the following detailed description of an embodiment, which is provided by way of non-limiting example, with reference to the accompanying drawings, in which.

DETAILED DESCRIPTION OF AN EMBODIMENT

Figure 1:
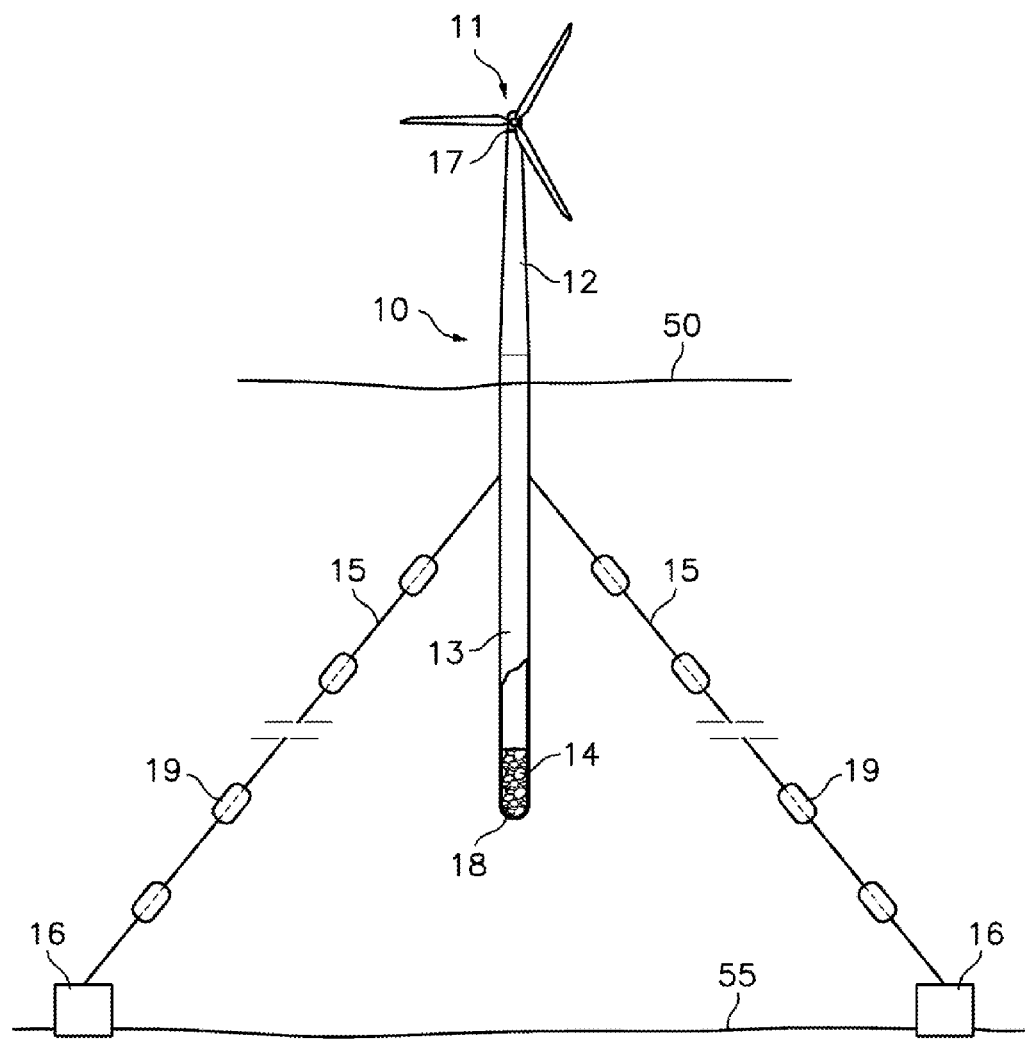
FIG. 1 is a diagrammatic partially cut-off side view of a floating structure for supporting a wind turbine according to an embodiment of the present invention.

As seen FIG. 1, the floating structure for supporting a wind turbine of the present invention comprises, according to one embodiment, a hollow precast monolithic concrete body 10 made of reinforced and prestressed concrete including cylindrical and frustoconical sections having a total length comprised between 110 and 320 meters. The precast monolithic concrete body 10 comprises a hollow cylindrical lower section 13 finished at a lower end thereof by a hemispheric cap 18 and a hollow generally frustoconical upper section 12. The lower section 13, which is closed by the hemispheric cap 18, contains ballast and acts as a flotation element, and the upper section 12 is located, in an operative vertical position, above sea level and acts as a support for a wind turbine or another element.

The precast monolithic concrete body 10 made of reinforced and prestressed concrete comprises active reinforcement members 20 (see FIG. 2) constituted by steel tendons inserted in protective sheaths. Some of the active reinforcement members have continuity within said hemispheric cap 18, and the upper section 12 is finished at an upper end thereof with a steel ring-shaped plate 17 to which some of the active reinforcement members are anchored. A wind turbine 11 is attached to the steel ring-shaped plate 17.

The flotation of the floating structure is assured by means of the hollow cylindrical lower section 13 which has a certain leeway on the average level of the sea surface SF and which is ballasted by means of ballast 14, such as aggregate and water, introduced into a lower portion thereof. The hemispheric cap 18 finishing the cylindrical concrete lower section 13 assures that the concrete in the area works fundamentally under compression and that cracks do not form due to the tensile stresses resulting from possible bending or pulling. The entire structure is outlined by means of using active reinforcement members so as to assure that the concrete does not decompress throughout its service life in order to prevent cracks and the consequences thereof from the point of view of durability.

The dimensions of the structure depend fundamentally on the actions to be applied in each case, being possible to adapt them according to the different needs of one case or another due to their geometric simplicity. The dimensions can vary in a range of diameters of between 5 and 15 meters and a draft of between 80 and 150 meters, with wall thicknesses that can vary from 20 to 100 centimeters. The frustoconical upper section 12 can have various heights depending on the wind turbine installed thereon, the wind conditions, etc. The diameter of upper section 12 is comprised between a lower diameter equivalent to the diameter of the cylindrical lower section 13 and an upper diameter smaller than the lower diameter, ranging between 3 and 5 m, depending on the installed wind turbine model.

In the section close to the surface of the sea level, the outer diameter of the cylindrical lower section 13 of the floating structure can be maintained or can somehow be reduced to attain a structure that is more permeable to the wave effect. In the embodiment shown in FIG. 1 the diameter is maintained throughout the entire lower section 13.

The precast monolithic concrete body 10 is moored to the seabed 55 by means of mooring lines 15 arranged symmetrically around a longitudinal axis thereof. Floating elements 19 are attached to different points along the mooring lines 15. These floating elements 19 are made of a material having a lower density than marine water. so that the weight of the mooring lines 15 is minimized when submerged to the extent that they acquire an almost rectilinear shape instead of an obvious catenary shape. The floating structure includes a controlled water flood and discharge system to enable adjusting both the flotation line of the precast monolithic concrete body 10 and the initial stress in the mooring lines 15.

The mooring to the seabed 55 is performed through mooring elements, such as heavy weight elements 16 or suction piles, to which the mooring lines 15 are fixed. The mooring elements are capable of counteracting the significant vertical and horizontal force components induced by the mooring lines 15, unlike the typical systems of anchors or less-weighed ballasts.

Figure 2:
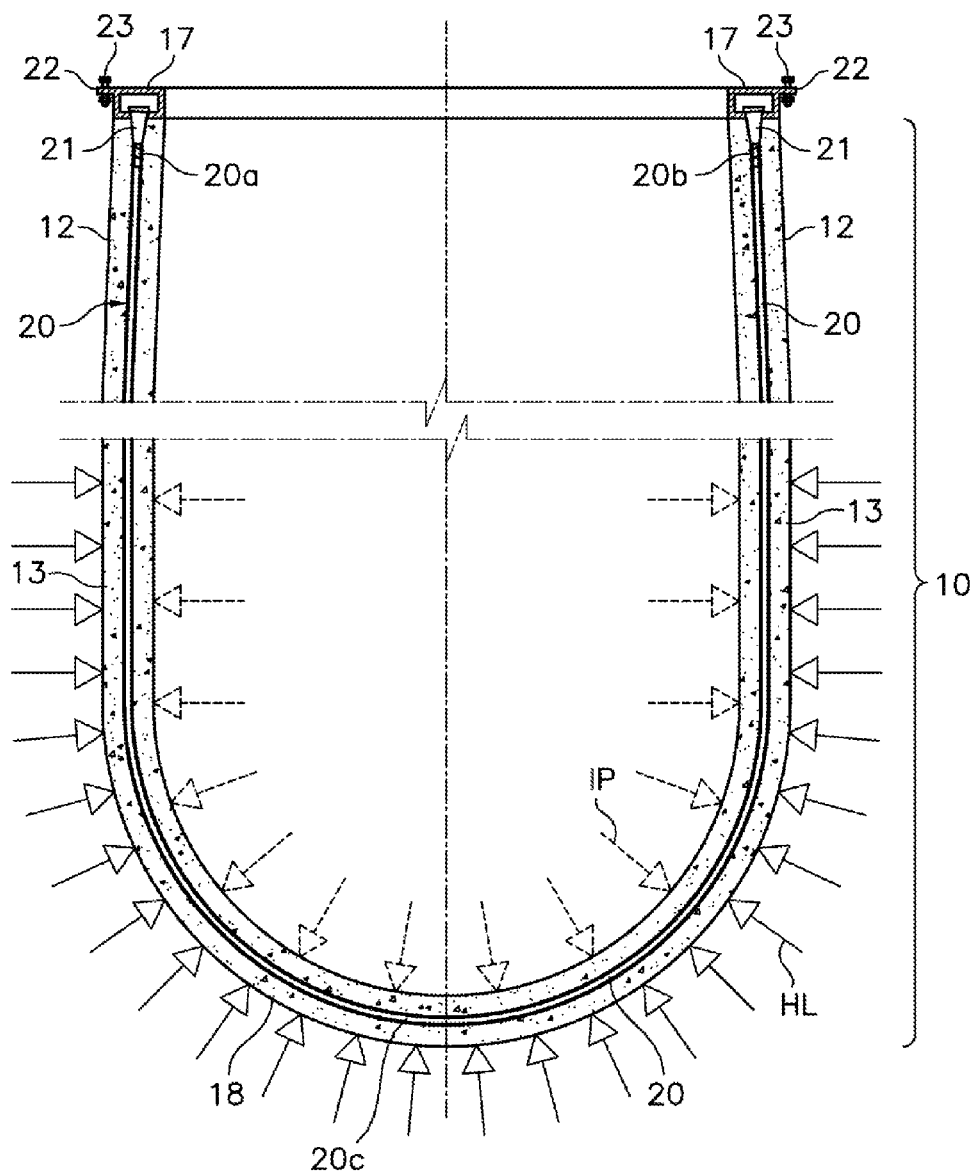
FIG. 2 shows a diagrammatic detail cross-sectional and cut-off view of an upper end of an upper section of the floating structure including a steel ring-shaped plate and a lower end of a lower section of the floating structure including a hemispheric cup.

FIG. 2 shows an upper end of the upper section 12 of the precast monolithic concrete body 10 where the steel ring-shaped plate 17 is attached and a lower end of the lower section 13 of the precast monolithic concrete body 10 which is closed by the hemispheric cap 18.

One or more of the active reinforcement members 20 have opposite ends 20*a*, 20*c* anchored to the steel ring-shaped plate 17 at diametrically opposite points thereof by means of anchoring elements 21 and an intermediate section 20*c* embedded in the concrete along opposite sides of the upper section 12, along opposite sides of the lower section 13, and from side to side along the hemispheric cap 18. Thus, said one or more active reinforcement members 20 are anchored at both ends thereof to the steel ring-shaped plate 17 and have continuity within the hemispheric cap 18.

The concrete wall thickness of the hemispheric cap 18 can vary between 30 and 100 cm, which allows giving continuity to one or more steel tendons constituting the active reinforcement members of the structure and which in turn allows distributing the pressure difference between a hydrostatic load HL exerted by the sea water on an outer surface of the lower section 13 and an inner pressure generated by the ballast 14 (not shown in FIG. 2) against an inner surface of the lower section 13 in the form of compression through the concrete, eliminating possible bending stresses on the element and therefore eliminating the risk of tractions and cracks.

The steel ring-shaped plate 17 is attached to the upper end of the upper section 12 of the precast monolithic concrete structure 10 by the anchoring elements 21 of the reinforcing members 20, so that the steel ring-shaped plate 20 is fixed to the concrete structure by means of the prestressing system itself and the steel ring-shaped plate 17 acts as a distribution plate for the anchoring elements 21. The steel ring-shaped plate 17 has perimetric cantilevered protrusions 22 that allow the connection of the wind turbine11 by means of fastening elements, for example bolts 23, such that a perfect plate-to-concrete attachment and plate-to-wind turbine attachment is assured.

The invention claimed is:

1. A floating structure for supporting a wind turbine, comprising:
   a hollow precast monolithic concrete body having a hollow cylindrical lower section closed at a lower end thereof by a hemispheric cap and an upper section;
   active reinforcement members embedded in said precast monolithic concrete body; and
   a steel ring-shaped plate attached to an upper end of said upper section;
   wherein in use said hollow cylindrical lower section contains ballast and acts as a flotation element, and said upper section is located above sea level and acts as a support for a wind turbine; and
   wherein at least one of said active reinforcement members has opposite ends anchored to said steel ring-shaped plate by anchoring elements and an intermediate section which is embedded in the concrete and extends along the upper section, along the hollow cylindrical lower section, and has continuity within the hemispheric cap.

2. The floating structure according to claim 1, wherein said precast monolithic concrete body has a total length comprised between 110 and 320 meters.

3. The floating structure according to claim 1, wherein the precast monolithic concrete body has outer diameters comprised between 2.8 and 15.2 meters and wall thicknesses comprised between 20 and 100 centimeters.

4. The floating structure according to claim 1, wherein said active reinforcement members are post tensioned steel tendons inserted in protective sheaths embedded in the concrete.

5. The floating structure according to claim 4, wherein some of the active reinforcement members are anchored at different points of the precast monolithic concrete body.

6. The floating structure according to claim 2, wherein the steel ring-shaped plate is attached to the precast monolithic concrete body by upper anchoring elements of the active reinforcement members, and in use the steel ring-shaped plate is attached to the wind turbine by fastening elements, thereby the steel ring-shaped plate performs a double function as an attachment for the wind turbine and as a distribution plate for said upper anchoring elements of the active reinforcement members.

7. The floating structure according to claim 1, wherein said precast monolithic concrete body is moored to the seabed by mooring lines having additional floating elements attached thereto at different points distributed therealong, said floating elements being made of a material having a density lower than the marine water, wherein the floating elements compensate for at least 50% of the weight of said mooring lines when submerged.

8. The floating structure according to claim 1, wherein said mooring lines comprise synthetic fiber ropes.

9. The floating structure according to claim 8, wherein said synthetic fiber ropes are polyester ropes made of polyethylene terephthalate (PET).

10. The floating structure according to claim 1, wherein the concrete includes silica fume, filler and admixtures as additional elements increasing the compactness and the final resistance thereof.

11. The floating structure according to claim 1, wherein said ballast comprises black slag from electric arc furnace.

* * * * *